(12) United States Patent
Moon et al.

(10) Patent No.: US 9,312,774 B2
(45) Date of Patent: Apr. 12, 2016

(54) SWITCH CONTROL METHOD, SWITCH CONTROLLER, AND CONVERTER COMPRISING THE SWITCH CONTROLLER

(71) Applicant: FAIRCHILD KOREA SEMICONDUCTOR LTD., Bucheon, Kyungki-do (KR)

(72) Inventors: Sang-Cheol Moon, Daejeon (KR); Hyun-Chul Eom, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 91 days.

(21) Appl. No.: 13/677,799

(22) Filed: Nov. 15, 2012

(65) Prior Publication Data

US 2013/0128627 A1     May 23, 2013

(30) Foreign Application Priority Data

Nov. 23, 2011 (KR) .......................... 10-2011-0123164

(51) Int. Cl.
    *H02M 3/335*        (2006.01)

(52) U.S. Cl.
    CPC ................................. *H02M 3/33507* (2013.01)

(58) Field of Classification Search
None
See application file for complete search history.

(56) References Cited

U.S. PATENT DOCUMENTS

| | | | |
|---|---|---|---|
| 4,994,766 A * | 2/1991 | Miura ............................ | 332/117 |
| 5,483,151 A * | 1/1996 | Yamashita ..................... | 323/312 |
| 5,923,542 A * | 7/1999 | Sasaki et al. .................... | 363/16 |
| 5,991,172 A | 11/1999 | Jovanovic et al. | |
| 6,480,401 B2 | 11/2002 | Tang | |
| 6,826,063 B2 | 11/2004 | Ichikawa et al. | |
| 6,977,824 B1 * | 12/2005 | Yang et al. ................. | 363/21.16 |
| 7,116,564 B2 * | 10/2006 | Takahashi ................... | 363/21.16 |
| 7,492,619 B2 * | 2/2009 | Ye et al. .......................... | 363/97 |
| 7,667,987 B2 | 2/2010 | Huynh et al. | |
| 7,869,229 B2 | 1/2011 | Huynh et al. | |
| 7,889,522 B2 | 2/2011 | Lin | |
| 7,911,814 B2 | 3/2011 | Tao et al. | |
| 7,978,484 B2 | 7/2011 | Grant et al. | |
| 2006/0114697 A1 * | 6/2006 | Yasumura ....................... | 363/16 |
| 2010/0002474 A1 * | 1/2010 | Moon et al. ................ | 363/21.18 |
| 2010/0194463 A1 * | 8/2010 | Moon et al. .................. | 327/427 |
| 2011/0037414 A1 | 2/2011 | Wang et al. | |
| 2011/0044076 A1 * | 2/2011 | Zhang et al. .............. | 363/21.17 |

* cited by examiner

*Primary Examiner* — Timothy J Dole
*Assistant Examiner* — Monica Mata
(74) *Attorney, Agent, or Firm* — Okamoto & Benedicto LLP

(57) ABSTRACT

The present invention relates to a converter, a switch controller controlling the switching operation of a power switch in the converter, and a switch control method. An exemplary embodiment of the present invention generates a reference current corresponding to an output current of the converter and generates a control voltage that depends on the reference current. The exemplary embodiment controls an increase or a decrease of the control voltage and determines a switching frequency of the power switch according to the control voltage. The exemplary embodiment controls the on-time of the power switch by using a reference voltage determined according to a control current that depends on the reference current.

20 Claims, 5 Drawing Sheets

SWITCH CONTROL METHOD, SWITCH CONTROLLER, AND CONVERTER COMPRISING THE SWITCH CONTROLLER

CROSS-REFERENCE TO RELATED APPLICATION

This application claims priority to and the benefit of Korean Patent Application No. 10-2011-0123164 filed in the Korean Intellectual Property Office on Nov. 23, 2011, the entire contents of which are incorporated herein by reference.

BACKGROUND OF THE INVENTION (a) Field of the Invention

The present invention relates to a switch control method, a switch controller, and a converter including the switch controller.

(b) Description of the Related Art

A converter preferably has a high power factor and a low total harmonic distortion (hereinafter, referred to as THD). However, efficiency of the converter may be decreased due to the high power factor and the low THD characteristic of the converter.

In further detail, when a high load is connected to a discrete conduction mode (DCM) flyback converter, a conduction loss may be increased. The conduction loss also occurs when currents flow into a rectifying diode, an inductor, and a switching element that form the DCM flyback converter.

In addition, when a low load is connected to the DCM flyback converter, a switching loss may be increased.

In a high load condition, the conduction loss is relatively greater than the switching loss. On the contrary, in a low load condition, the switching loss is relatively greater than the conduction loss.

The preceding description of the related art is only offered to enhance the understanding of the background of the invention and therefore it may contain information that does not form a part of the prior art that is already known in this country to a person of ordinary skill in the art.

SUMMARY OF THE INVENTION

The present invention has been made in an effort to provide a switch control method for improving the efficiency of a switch controller, and a converter including the switch controller.

A switch controller according to an exemplary embodiment of the present invention controls switching operation of a power switch in a converter. The switch controller includes: a control voltage generator generating a reference current corresponding to an output current of the converter, and generating a control voltage that depends on the reference current; a frequency controller controlling increase or decrease of the control voltage, and controlling a switching frequency of the power switch according to the reference current; and an on-time controller controlling the on-time of the power switch using a reference voltage determined by a control current that depends on the reference current.

The control voltage generator includes: a variable current source generating the reference current that varies according to the output current; a charging current source generating a charging current according to the reference current; a discharging current source generating a discharging current according to the reference current; and a capacitor connected to a node to which the charging current source and the discharging current source are connected, wherein the control voltage is a voltage charged in the capacitor.

The variable current source includes a transistor through which the reference current flows and an operational amplifier which has an output terminal connected to a gate electrode of the transistor. The operational amplifier controls the transistor to change the reference current according to the output current.

The control voltage generator further includes a current mirror circuit mirroring the reference current and transmitting mirrored current to the charging current and the discharging current, the charging current generates the charging current by converting the transmitted reference current with a first mirror ratio and the discharging current generates the discharging current by converting the transmitted reference current with a second mirror ratio.

The control voltage generator further includes a switch connected between the discharging current and the ground and turned off at a turn-on time of the power switch, and the second mirror ratio is greater than the first mirror ratio.

The frequency controller includes: a rising comparator controlling an increase of the control voltage by comparing the control voltage and a rising threshold voltage; a falling comparator controlling a decrease of the control voltage by comparing the control voltage and a falling threshold voltage; and an SR flip-flop receiving outputs of the rising comparator and the falling comparator, stopping the increase of the control voltage according to the output of the rising comparator, and stopping the decrease of the control voltage according to the output of the falling comparator.

The control voltage generator includes: a charging current source generating a charging current according to the reference current; a discharging current source generating a discharging current according to the reference current; a capacitor connected to a node to which the charging current source and the discharging current source are connected; and a switch connected between the discharging current source and the ground.

The SR flip-flop turns off the switch according to the output of the falling comparator and turns on the switch according to the output of the rising comparator. A voltage charged in the capacitor is the control voltage. A turn-on time point of the power switch is controlled according to the output of the falling comparator.

The on-time controller controls the turn-off of the power switch at a time point at which an on-time control voltage increasing from the turn-on time point of the power switch reaches the reference voltage.

The on-time controller includes: a control current source receiving the reference current and generating the control current by converting the received reference current with a predetermined ratio; a resistor in which the reference voltage is generated from flow of the control current; a capacitor being charged by a predetermined constant current from a turn-on time point of the power switch and generating the on-time control voltage; and a control comparator comparing the reference voltage with the on-time control voltage.

The frequency controller includes: a rising comparator controlling an increase of the control voltage by comparing the control voltage with a rising threshold voltage; a falling comparator controlling a decrease of the control voltage by comparing the control voltage with a falling threshold voltage; and an SR flip-flop receiving outputs of the rising comparator and the falling comparator, stopping the increase of the control voltage according to the output of the rising comparator, and stopping the decrease of the control voltage according to the output of the falling comparator.

The on-time controller further includes a switching transistor operating according to the output of the falling comparator, and the switching transistor is connected to the capacitor in parallel.

A switch control method according to another exemplary embodiment of the present invention controls switching operation of a power switch in a converter. The switch control method includes: generating a reference current corresponding to an output current of the converter; increasing or decreasing of a control voltage according to the reference current; sensing the control voltage, and controlling the increase or the decrease of the control voltage; controlling a switching frequency of the power switch according to the reference current; and controlling on-time of the power switch using a reference voltage determined according to a control current that depends on the reference current.

The increasing or decreasing of the control voltage according to the reference current includes charging a capacitor using a charging current that depends on the reference current and discharging of the capacitor using a discharging current that depends on the reference current, and a voltage of the capacitor is the control voltage.

The controlling of the increase or the decrease of the control voltage includes: comparing the control voltage with a rising threshold voltage; comparing the control voltage and a falling threshold voltage; and stopping the increase of the control voltage according to a result of the comparison between the control voltage and the rising threshold voltage and stopping the decrease of the control voltage according to a result of the comparison between the control voltage and a falling threshold voltage.

The controlling of the switching frequency includes turning on the power switch according to a result of the comparison between the control voltage, controlled according to the reference current, and the falling threshold voltage.

The controlling of the on-time includes controlling the turn off of the power switch at a time point at which an on-time control voltage increasing from a turn-on time point of the power switch reaches the reference voltage.

A converter according to another exemplary embodiment of the present invention includes: a transformer transmitting power of a primary side to a secondary side; a power switch connected to a coil in the primary side of the transformer; a feedback unit synchronizing a reference current of the primary side according to an output current of the secondary side; and a switch controller generating a reference current corresponding to the output current, controlling a switching frequency of the power switch according to the reference current, and controlling on-time of the power switch using a reference voltage determined according to a control current that depends on the reference current.

The switch controller generates a control voltage increased or decreased according to the reference current, controls the increase of the control voltage by comparing the control voltage with a rising threshold voltage, controls the decrease of the control voltage by comparing the control voltage with a falling threshold voltage, and controls a turn-on time point of the power switch according to a result of the comparison between the control voltage and the falling threshold voltage.

The switch controller controls the turn-off of the power switch at a time point at which an on-time control voltage increasing from a turn-on time point of the power switch reaches the reference voltage.

According to the exemplary embodiments of the present invention, efficiency of a DCM flyback converter having a high power factor and low THD can be improved.

DETAILED DESCRIPTION OF THE EMBODIMENTS

Figure 1:
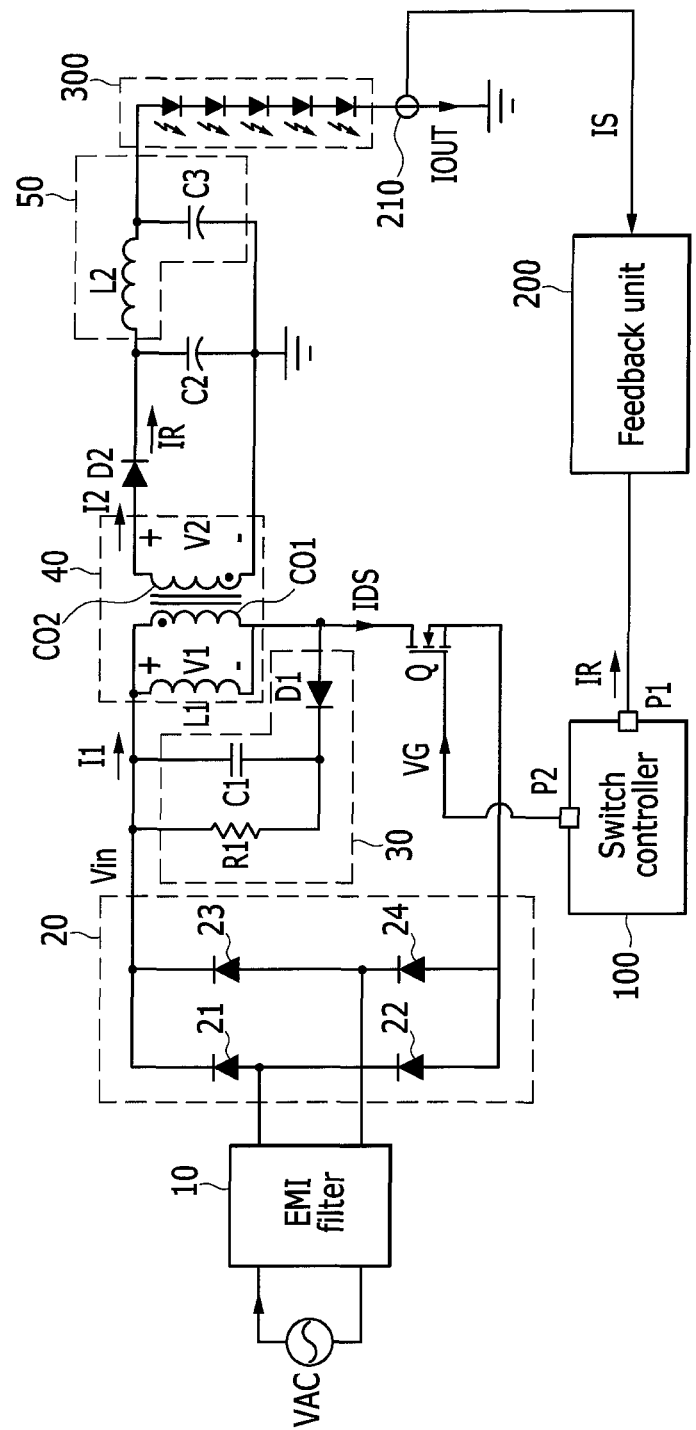
FIG. 1 shows a DCM flyback converter including a switching controller according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 shows a DCM flyback converter including a switching controller according to an exemplary embodiment of the present invention.

As shown in FIG. 1, a switch controller 100 receives an output current as a feedback and generates a gate signal controlling switching operation of a power switch Q.

An AC input VAC input to a DCM flyback converter 1 is passed through an EMI filter 10 and then transmitted to a bridge rectifying diode 20.

The bridge rectifying diode 20 generates an input voltage Vin by rectifying the AC input VAC. The bridge rectifying diode 20 includes four diodes 21 to 24.

A snubber circuit 30 is connected between the input voltage Vin and the power switch Q, and limits a voltage stress of the power switch Q. The snubber circuit 30 includes a resistor R1, a capacitor C1, and a diode D1.

First terminal of each of the resistor R1 and the capacitor C1 is connected to the input voltage Vin, an anode of the diode D1 is connected to a drain terminal of the power switch Q, and a second terminal of each of the resistor R1 and the capacitor C1 is connected to a cathode of the diode D1.

A transformer 40 converts a primary side power generated by the input voltage Vin and transmits the converted power to a secondary side. The transformer 40 includes a first coil CO1 and a second coil CO2, and a magnetizing inductance L1 is formed between the primary side coil CO1 and the secondary side coil CO2 of in the transformer 40.

The first coil CO1 includes a first terminal to which the input voltage Vin is transmitted and a second terminal connected to the power switch Q. The second coil CO2 is formed in the secondary side of the transformer 40, and a voltage and a current are generated in the second coil CO2 by the power transmitted from the primary side of the transformer 40.

A turn ratio nps (the number of windings of CO2 ns/the number of windings of CO1 np) is determined according to the number of windings of the first coil CO1 and the number of windings of the second coil CO2. A ratio V2/V1 between a voltage V1 of the first coil CO1 of the transformer 40 and a voltage V2 of the second coil CO2 is proportional to the turn ratio nps, and a ratio I2/I1 between a current I1 of the first coil CO1 and a current I2 of the second coil CO2 is inversely proportional to the turn ratio nps.

The rectifying diode D2 includes an anode connected to the first terminal of the second coil CO2 and a cathode connected to a first terminal of an LC output filter 50 and a first terminal of a capacitor C2. The rectifying diode D2 rectifies a current I2 flowing to the second coil CO2. The capacitor C2 is charged by the current IR rectified through the rectifying diode D2 and thus the output voltage VOUT is generated.

An inductor L2 and a capacitor C3 form the LC output filter 50 and filters noise of the output voltage VOUT. An output current IOUT is supplied to a load 300 by the output voltage VOUT.

In FIG. 1, a LED string formed by coupling a plurality of LED elements in series is illustrated as a load of the DCM flyback converter 1. However, a load to which the converter 1 can be applied is not limited thereto.

The power switch Q is connected to the first coil CO1, and a current I1 flowing to the first coil CO1 is controlled by switching operation of the power switch Q.

The current I1 is increased during a turn-on period of the power switch Q, and does not flow during a turn-off period of the power switch Q. During the turn-on period of the power switch Q, the current I1 is increased and energy is stored in the first coil CO1. In this case, since the rectifying diode D2 is in the turn-off state, no current flows to the second coil CO2. During the turn-off period of the power switch Q, the current I2 of the second coil CO2 is rectified therein through the rectifying diode D2.

When the output voltage VOUT is instantaneously increased, the output current IOUT is increased. When the output voltage VOUT is instantaneously decreased, the output current IOUT is decreased. In the exemplary embodiment, the output current IOUT is sensed to constantly maintain the output current IOUT according to control of a constant current. In further detail, a current sensor 210 senses the output current IOUT passed through the load 300 and transmits a sense current IS to a feedback unit 200.

The feedback unit 200 receives the sense current IS of the secondary side, and synchronizes a reference current IS according to the sense current IS from the switch controller 100 of the primary side. The feedback unit 200 synchronizes the reference current IR according to the output current IOUT flowing to the secondary side by using an insulation means such as an opto-coupler. The primary side and the secondary side of the DCM flyback converter 1 is isolated in the exemplary embodiment of the present invention.

The switch controller 100 controls a switching frequency and a turn-on time according to the reference current IR. The switch controller 100 generates the reference current IR according to the output current IOUT, and controls the switching frequency and the turn-on time according to the reference current IR.

The switch controller 100 includes two connection terminals P1 and P2, is connected to the feedback unit 200 through the first connection terminal P1 and connected to the gate electrode of the power switch Q through the second connection terminal P2.

Hereinafter, the switch controller 100 will be described in further detail with reference to FIG. 2.

Figure 2:
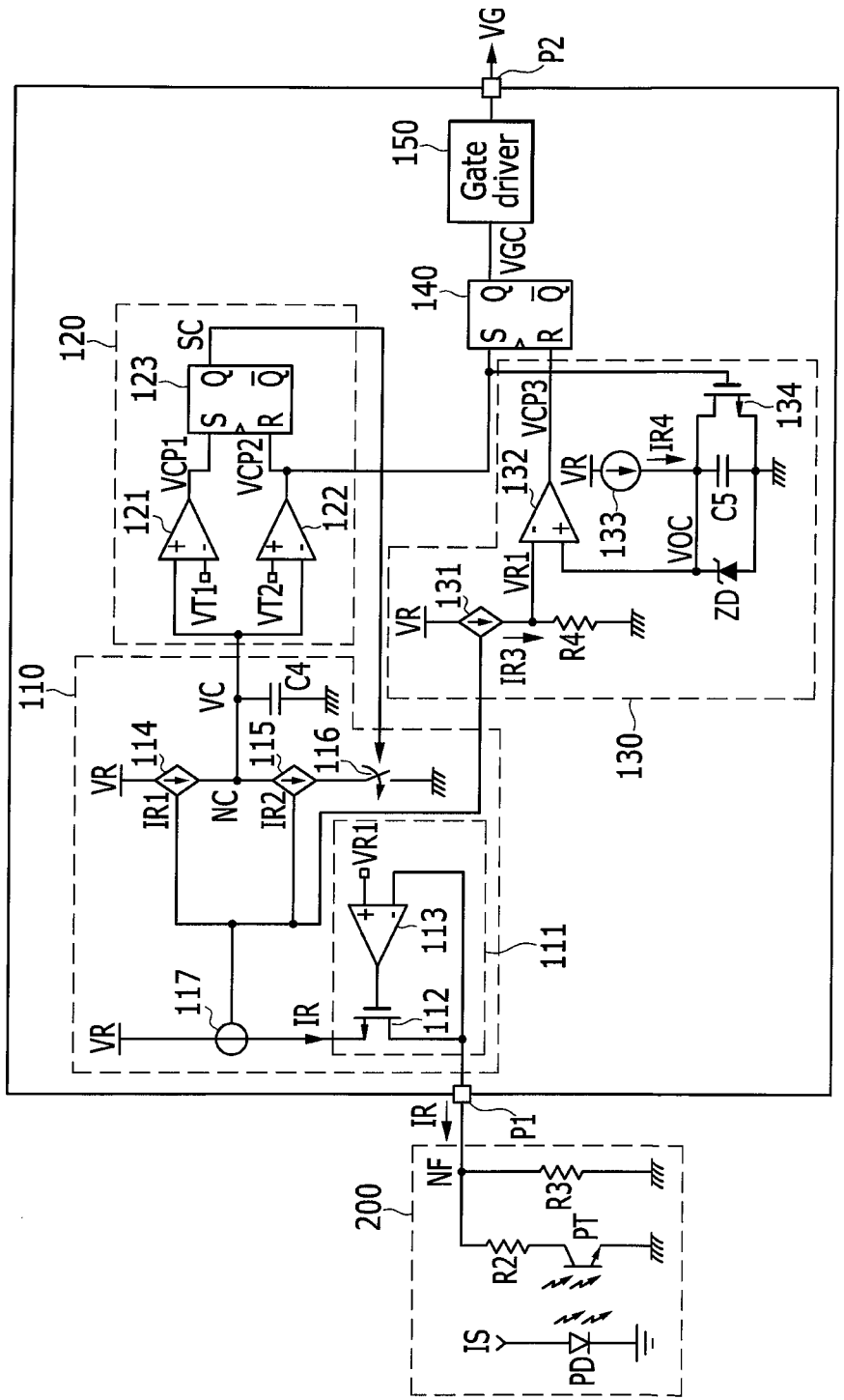
FIG. 2 is a circuit diagram of the switch controller according to the exemplary embodiment of the present invention.

FIG. 2 is a circuit diagram of the switch controller according to the exemplary embodiment of the present invention.

As shown in FIG. 2, the switch controller 100 includes a control voltage generator 110, a frequency controller 120, an on-time controller 130, an SR flip-flop 140, and a gate driver 150.

FIG. 2 illustrates a configuration of the feedback unit 200 connected to the first connection terminal P1 and the switch controller 100. The sense current IS flows through a photodiode PD, a current according to a light emission amount of the photodiode PD flows to a photo transistor PT forming the opto-coupler with the photodiode PD.

A first terminal of the resistor R2 is connected to a collector of the photo transistor PT, a second terminal of a resistor R2 is connected to a node NF, and a resistor R3 is connected between the node NF and the ground.

The control voltage generator 110 generates the reference voltage IR that varies according to the sense current IS, and generates a control voltage VD repeats increase and decrease according to the reference current IR.

The control voltage generator 110 includes a variable current source 111, a charging current source 114, a discharging current source 115, a switch 116, a current mirror circuit 117, and a capacitor C4.

The variable current source 111 includes a transistor 112 and an operation amplifier 113, and generates the reference current IR while maintaining the connection terminal P1 with a reference voltage VR1.

The operation amplifier 113 includes an inversion terminal (+) connected to the node NF of the feedback unit 200 through the connection terminal P1 and a non-inversion terminal (+) connected to the reference voltage VR1. An output terminal of the operation amplifier 113 is connected to a gate electrode of a transistor 112. A source electrode of the transistor 112 is connected to the node NF through the connection terminal P1 and a drain electrode of the transistor 112 is connected to the voltage VR.

The operation amplifier 113 maintains a voltage of the inversion terminal (−) and a voltage of the non-inversion terminal (+) to be equal to each other, and therefore a voltage of the node NF is maintained with the reference voltage VR1.

When the load is increased, the sense current IS is increased, and therefore a light emission amount of the photodiode PD is increased and a current flowing to the photo transistor PT is increased. In this case, the operation amplifier 113 controls the transistor 112 to increase the reference current IR according to a current increase of the photo transistor PT. That is, an output of the operation amplifier 113 is increased.

Since the sense current IS is decreased when the load is decreased, the light emission amount of the photo diode PD is decreased and the current flowing to the photo transistor PT is decreased. In this case, the operation amplifier 113 controls the transistor 112 to decrease the reference current IR according to a current decrease of the photo transistor PT. That is, the output of the operation amplifier 113 is decreased.

The reference current IR is mirrored through the current mirror circuit 117 and thus transmitted to the charging current source 114, the discharging current source 115, and the control current source 131, respectively. The charging current source 114 converts the transmitted current with a first mirror ratio to generate a charging current IR1. The discharging current source 115 converts the transmitted current with a second mirror ratio to generate a discharging current IR2.

In this case, the first mirror ratio is different from the second mirror ratio, and the second mirror ratio is set twice the first mirror ratio in the exemplary embodiment of the present invention. Thus, the discharging current IR2 is two times the charging current IR1.

The charging current source 114 and the discharging current source 115 receive an operation voltage from the voltage VR, and connected in series to a node NC. The charging current source 114 is connected between the voltage VR and the node NC, and the discharging current source 115 is connected between the node NC and a first terminal of the switch 116. A second terminal of the switch 116 is connected to the ground, and switching operation thereof is controlled by a switching control signal SC of the frequency controller 120.

In the exemplary embodiment of the present invention, the switch 116 is turned on by a high-level switching control signal SC and turned off by a low-level switching control signal SC. The capacitor C4 is connected between the node NC and the ground, a voltage of the node NC is a control voltage, and the control voltage VC is changed by charging/discharging of the capacitor C4.

While the capacitor C4 is charged by the charging current IR1, the control voltage VC is increased with a constant slope determined according to the charging current IR1. While the capacitor C4 is discharged by the discharging current IR2, the control voltage VC is decreased with a constant slope determined by a difference between the discharging current IR2 and the charging current IR1. In the above description, the discharging current IR2 is described as two times the charging current IR1, and therefore the increase slope of the control voltage VC and the decrease slope of the control voltage VC are equivalent to each other.

As described, the control voltage generator 110 may generate the reference voltage IR varying according to feedback information, and may increase or decrease the control voltage VC using the reference current IR.

The frequency controller 120 controls the increase or decrease of the control voltage VC, and determines a turn-on time of the power switch Q according to the control voltage VC. In the exemplary embodiment, the increase or decrease slope of the control voltage VC is determined according to the reference current IR, and therefore the turn-on time and the switching frequency are controlled according to the reference current IR. Resultantly, the frequency controller 120 controls the turn-on time and the switching frequency according to the reference current IR. The frequency controller 120 senses the control voltage VS to control the increase or decrease of the control voltage VC.

The frequency controller 120 includes a rising comparator 121, a falling comparator 122, and an SR flip-flop 123. The frequency controller 120 according to the exemplary embodiment of the present invention uses the rising comparator 121 and the falling comparator 122 to sense the control voltage VC.

The rising comparator 121 controls the increase of the control voltage VC by comparing the control voltage VC with a rising threshold voltage VT1. The rising comparator 121 includes a non-inversion terminal (+) to which the control voltage VC is input and an inversion terminal (−) to which the rising threshold voltage VT1 is input. The rising comparator 121 generates a high-level first comparison signal VCP1 when the control voltage VC is higher than the rising threshold voltage VT1 and generates a low-level first comparison signal VCP1 when the control voltage VC is lower than the rising threshold voltage VT1.

The falling comparator 122 controls the decrease of the control voltage VC by comparing the control voltage VC with a falling threshold voltage VT2. The falling comparator 122 includes an inversion terminal (−) to which the control voltage VC is input and a non-inversion terminal (+) to which the falling threshold voltage VT2 is input. The falling comparator 122 generates a high-level second comparison signal VCP2 when the control voltage VC is lower than the falling threshold voltage VT2 and generates a low-level second comparison signal VCP2 when the control voltage VC is higher than the falling threshold voltage VT1.

The SR flip-flop 123 receives the first comparison signal VCP1 and the second comparison signal VCP2, and generates a switching control signal SC according to a logic level of the two signals. The SR flip-flop 123 generates a switching control signal SC that stops increase of the control voltage VC according to the first comparison signal VCP1, and generates a switching control signal SC that stops decrease of the control voltage VC according to the second comparison signal VCP2.

The SR flip-flop 123 includes a set terminal S to which the first comparison signal VCP1 is input and a reset terminal R to which the second comparison signal VCP2 is input, increases an output to high level by being synchronized by a rising edge of a signal input to the set terminal S and decreases the output to low level by being synchronized by a rising edge of a signal input to the reset terminal S.

Since the output of the SR flip-flop 123 is the switching control signal SC, the SR flip-flop 123 generates a high-level switching control signal SC at a rising time point of the first comparison signal VCP1 and outputs the generated signal through an output terminal Q, and generates a low-level switching control signal SC at a rising time point of the second comparison signal VCP2 and outputs the generated signal through the output terminal Q.

That is, the switching control signal SC becomes high level at a time point at which the control voltage VC reaches the rising threshold voltage VC1 (the switch 116 is turned on), and the control voltage VC starts to decrease by the discharging current IR2. In addition, the switching control signal SC becomes low level at a time point at which the control voltage VC reaches the falling threshold voltage VC2 (the switch 116 is turned off), and the control voltage VC starts to increase by the charging current IR1.

The second comparison signal VCP2 is input to the set terminal S of the SR flip-flop 140 to control the turn-on time of the power switch Q.

The on-time controller 130 controls the on-time of the power switch Q by using a control current IR3 corresponding to the reference current IR. The on-time controller 130 controls the turn-off of the power switch Q at a time point at which an on-time control voltage VCO increasing from the turn-on time point of the power switch Q reaches the reference voltage VR1 determined according to the control current IR3.

The on-time controller 130 can sense the turn-on time point of the power switch Q by using the second comparison signal VCP2. However, the present invention is not limited thereto, and the on-time controller 130 may sense the turn-on time point of the power switch Q by using the gate control signal VGC or the gate signal VG.

The on-time controller 130 includes a control current source 131, a control comparator 132, a constant current source 133, a zener diode ZD, a switching transistor 134, a capacitor C5, and a resistor R4.

The control current source 131 generates the control current IR3 by converting the reference current IR mirrored and transmitted through the current mirror circuit 117 with a third mirror ratio. The voltage VR supplies an operation voltage required for the control current source 131 to generate the control current IR3.

The control current IR3 is a current setting the reference voltage VR1 determining on-time. The reference voltage VR1 is generated while the control current IR3 flows to the resistor R4. Thus, the third mirror ratio may be set to a value for on-time setting.

The constant current source 133 generates a constant current IR4, and the voltage VR supplies an operation voltage for the constant current source 133 to generate the constant current IR4. The capacitor C5 includes a first terminal to which the constant current IR4 is supplied and a second terminal connected to the ground.

The switching transistor 134 is coupled to the capacitor C5 in parallel, and turned on by a level of the second comparison signal VCP2, instructing the turn-on of the power switch Q to discharge the capacitor C5.

The zener diode ZD is coupled to the capacitor C5 in parallel, and clamps an on-time control voltage VOC that is a voltage charged in the capacitor C5 with a constant zener voltage VZD.

The control comparator 132 generates a third comparison signal VCP3 that controls the turn-on time of the power switch Q according to a result of comparison between the on-time control voltage VOC and the reference voltage VR1. The control comparator 132 includes an inversion terminal (−) to which the reference voltage VR1 is input and a non-inversion terminal (+) to which the on-time control voltage VCO is input.

The control comparator 131 generates a high-level third comparison signal VCP3 when the on-time control voltage VOC is higher than the reference voltage VR1, and generates a low-level third comparison signal VCP3 when the on-time control voltage VOC is lower than the reference voltage VR1. Thus, the high-level third comparison signal VCP3 is generated when the increasing on-time control voltage VOC reaches the reference voltage VR1.

The SR flip-flop 140 receives the second comparison signal VCP2 and the third comparison signal VCP3, and generates a gate control signal VGC that controls on and off of the power switch Q according to logic levels of the two signals.

The SR flip-flop 140 includes a set terminal S to which the second comparison signal VCP2 is input and a reset terminal R to which the third comparison signal VCP3 is input. The SR flip-flop 140 generates a high-level output by being synchronized by a rising edge of a signal input to the set terminal S and outputs the generated signal through the output terminal Q. The SR flip-flop 140 generates a low-level signal by being synchronized by a rising edge of a signal input to the reset terminal R and outputs the generated signal through the output terminal Q.

Thus, the SR flip-flop 140 generates a high-level gate control signal at a rising time point of the second comparison signal VCP2, and generates a low-level gate control signal at a rising time point of the third comparison signal VCP3.

The gate driver 150 generates a gate signal VG that turns on the power switch Q according to the high-level gate control signal VGC, and generates a gate signal VG that turns off the power switch Q according to the low-level gate control signal VGC.

Hereinafter, a switch control method according to an exemplary embodiment of the present invention will be described with reference to FIG. 3.

Figure 3:
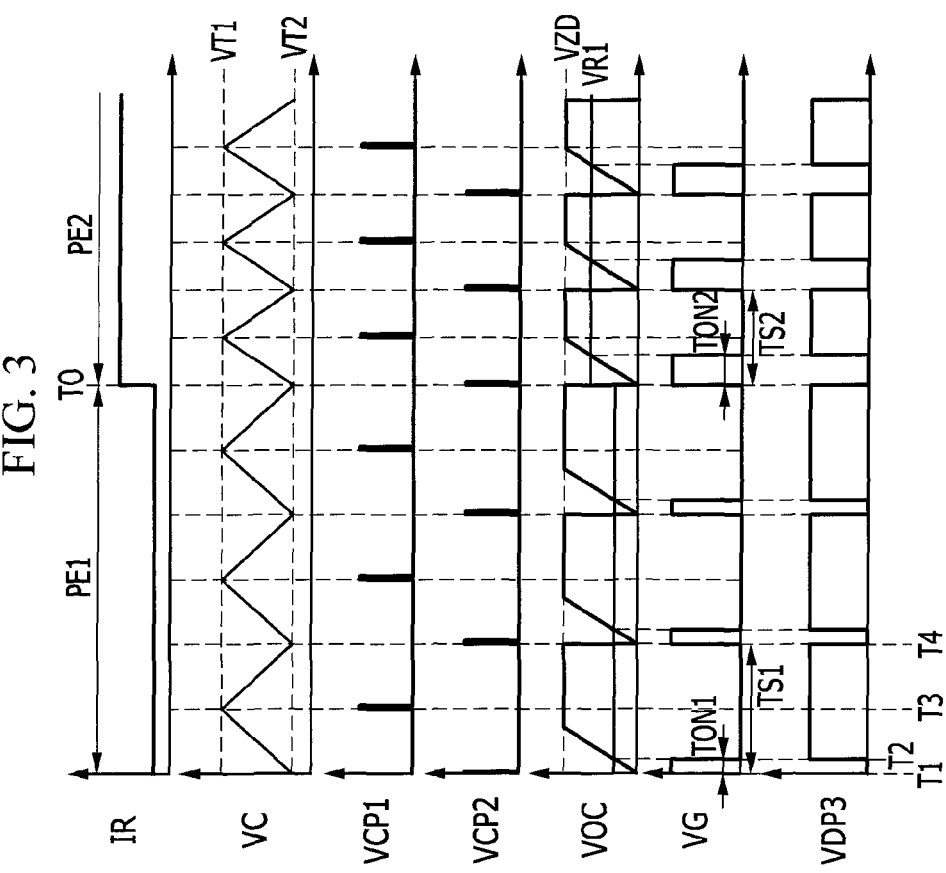
FIG. 3 is a waveform diagram of an input signal, an internal signal, and an output signal of the switch controller according to the exemplary embodiment of the present invention.

FIG. 3 is a waveform diagram illustrating waveforms of an input signal, an internal signal, and an output signal of a switch controller according to the exemplary embodiment of the present invention.

In FIG. 3, a period PE1 before a time point T0 has waveforms in a low load and a period PE2 after the time point T0 has waveforms in a high load.

In a time point T1, a control signal VC has the same level of a falling threshold voltage VT2, and a second comparison signal VCP2 increases to high level. An SR flip-flop 140 generates a high-level gate control signal VGC by a high-level comparison signal VCP2, and a gate driver 150 generates a high-level gate signal VG.

During the time point T1, the high-level second comparison signal is input to a reset terminal S of the SR flip-flop 123, and the SR flip-flop 123 generates a low-level switching control signal SC. Then, during the time point T1, a switch 116 is turned off, a capacitor C4 is charged according to a charging current IR1, and a control voltage VC starts to increase.

When the control voltage VC starts to increase, the second comparison signal VCP2 becomes low level. Thus, as shown in FIG. 3, the second comparison signal VCP2 is illustrated as a short-pulse waveform.

After the time point T1, the second comparison signal VCP2 becomes low level and a switching transistor 134 is in the turn-off state, and therefore a capacitor C5 is charged by a constant current IR4. Accordingly, an on-time control voltage starts to increase.

In a time point T2 that the increasing on-time control voltage VOC reaches a reference voltage VR1, a third comparison signal VCP3 becomes high level. The increasing on-time control voltage VOC is clamped to a zener voltage VZD.

In the time point T2, the SR flip-flop 140 generates a low-level gate control signal VGC according to a high-level third comparison signal VCP3 and the gate driver 150 generates a low-level gate signal VG.

At a time point T3 that the increasing control voltage VC reaches a rising threshold voltage VT1, the first comparison signal VCP1 is increased to high level. in the time point T3, the high-level first comparison signal VCP1 is input to a set terminal R of an SR flip-flop 123 and the SR flip-flop 123 generates a high-level switching control signal SC. Then, in the time point T3, the switch 116 is turned off, the capacitor C4 is discharged according to a difference between the discharging current IR2 and the charging current IR1, and the control voltage VC starts to decrease.

When the control voltage VC starts to decrease, the first comparison signal VCP1 becomes low level. Thus, as shown in FIG. 3, the first comparison signal VCP1 is illustrated as a short-pulse waveform.

Operation from a time point T4 that the decreasing control voltage VC reaches the falling threshold voltage VT2 is the same as the operation from the time point T1.

When a load is increased at the time point T0, the reference current IR starts to increase, as shown in FIG. 3. In addition, since a control current IR3 is increased as the reference current IR is increased, the reference voltage VR1 is also increased. The period PE1 and the period PE2 are different in values of the reference current IR and the reference voltage VR1, but the operation during the period PE1 is equivalent to the operation during the period PE2.

In FIG. 3, a cycle TS1 of the gate signal VG of the period PE1 is longer than a cycle TS2 of the gate signal VG of the period PE2. That is, a switching frequency of the period PE2 is higher than that of the period PE1. In addition, an on-time TON2 of the period PE2 is longer than an on-time TON1 of the period PE1.

The switch control method according to the exemplary embodiment of the present invention increases the switching frequency and the on-time according to the increase of the load. For example, the switching frequency may be controlled to be linearly increased according to the increase of the load.

Figure 4:
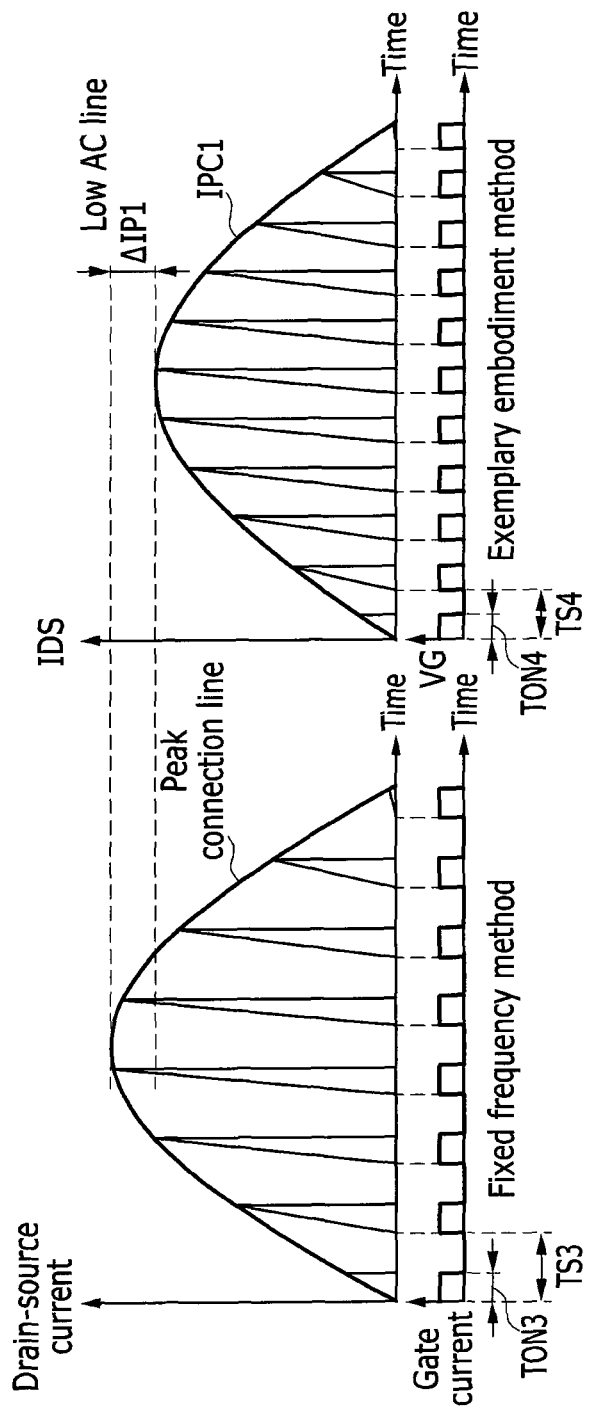
FIG. 4 is a waveform diagram of a drain-source current waveform, on-time, and a switching cycle for representing differences therebetween according to a switch control method based on a conventional fixed frequency and a switch control method according to the exemplary embodiment of the present invention.

FIG. 4 is a waveform diagram illustrating a waveform of a drain-source current, an on-time, and a switching cycle for description of a difference between a switch control method according to a conventional fixed frequency and the switch control device according to the exemplary embodiment of the present invention.

In FIG. 4, the peak connection line represents a line connecting a peak current of a drain-source current according to a conventional method and "PIC1" represents a line connecting a peak current of a drain-source current according to the exemplary embodiment of the present invention.

In FIG. 4, a switching cycle TS4 according to the exemplary embodiment is shorter than a switching cycle TS3, and an on-time TON4 according to the exemplary embodiment is shorter than an on-time TON3. That is, in a high load condition, compared to the conventional method, the switching frequency is increased and the on-time is shortened according to the exemplary embodiment of the present invention.

Since the on-time TON3 according to the conventional method is longer than the on-time TON4 according to the exemplary embodiment, the maximum peak value of the drain-source current according to the conventional method is higher by ΔIP1 than the maximum peak value of the drain-source current IDS of the exemplary embodiment.

In the high load condition, a conduction loss determines efficiency of a converter. That is, according to the exemplary embodiment of the present invention, in the high load condition, a switching loss is increased due to the increase of the switching frequency, but a decrease amount of the conduction loss due to a decrease of the peak current is greater than an increase amount of the switching loss.

Figure 5:
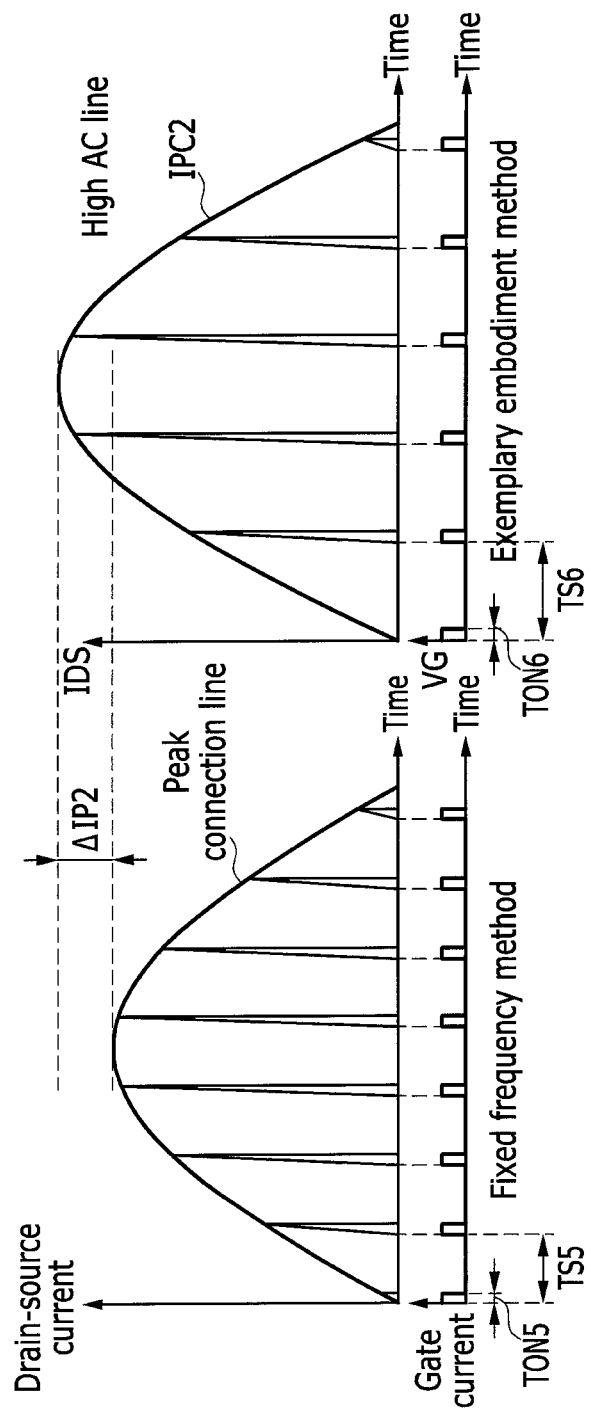
FIG. 5 is a waveform diagram of a drain-source current waveform, on-time, and a switching cycle for representing differences therebetween according to a switch control method based on the conventional fixed frequency and the switch control method according to the exemplary embodiment of the present invention, in a low load condition.

FIG. 5 is a waveform diagram illustrating a drain-source waveform, an on-time, and a switching cycle for description of a difference between the switch control method according to the conventional method using the fixed frequency and the switch control method according to the exemplary embodiment, in a low load condition.

In FIG. 5, the peak connection line represents a line connecting a peak current of a drain-source current according to the conventional method, and "ICP2" represents a line connecting a peak current of a drain-source current according to the exemplary embodiment of the present invention.

In FIG. 5, a switching cycle TS5 according to the exemplary embodiment is longer than a switching cycle TS5, and an on-time TON6 according to the exemplary embodiment is longer than an on-time TON5. That is, in a low load condition, compared to the conventional method, the switching frequency is lowered and the on-time is increased according to the exemplary embodiment of the present invention.

Since the on-time TON6 according to the exemplary embodiment is longer than the on-time TON5 according to the conventional method, the maximum peak value of the drain-source current IDS is greater by ΔIP2 than the maximum peak value of the drain-source current according to the conventional method.

In the low load condition, a switching loss determines efficiency of a converter. That is, in the low load condition, the conduction loss is increased due to the increase of the peak-current according to the exemplary embodiment of the present invention, but a decrease amount of switching loss due to the decrease of the switching frequency is greater than an increase amount of the conduction loss.

According to the exemplary embodiments of the present invention, a switch control method that can increase efficiency according to a load while maintaining a high power factor and a low THD, a switch controller, and a converter including the switch controller can be provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

DCM flyback converter 1, EMI filter 10, bridge rectifying diode 20 switch controller 100, snubber circuit 30 power switch Q resistor (R1, R2, R3, R4), capacitor (C1, C2, C3, C4, C5), diode D1 transformer 40, first coil CO1, second coil CO2, rectifying diode D2

LC output filter 50, inductor L2, load 300, current sensor 210, feedback unit 200 control voltage generator 110, frequency controller 120, on-time controller 130

SR flip-flop 140, gate driver 150, photodiode PD photo transistor (PT), variable current source 111, charging current source 114 discharging current source 115, switch 116, current mirror circuit 117, transistor 112 operation amplifier 113, rising comparator 121, falling comparator 122, SR flip-flop 123 control current source 131, control comparator 132, constant current source 133, zener diode ZD switching transistor 134

What is claimed is:

1. A switch controller controlling switching operation of a power switch in a converter, comprising:
   a control voltage generator generating a reference current based on a detected signal indicative of an output current of the converter, and generating a control voltage that depends on the reference current;
   a frequency controller controlling increase or decrease of the control voltage, and controlling a switching frequency of the power switch according to the reference current, the frequency controller increasing the switching frequency of the power switch when the output current increases; and
   an on-time controller controlling an on-time of the power switch using a reference voltage determined according to the reference current, the on-time controller increasing the on-time of the power switch when the output current decreases.

2. The switch controller of claim 1, wherein the control voltage generator comprises:
   a variable current source generating the reference current that varies according to the output current;

a charging current source generating a charging current according to the reference current;

a discharging current source generating a discharging current according to the reference current; and a capacitor connected to a node to which the charging current source and the discharging current source are connected, and a voltage charged in the capacitor is the control voltage.

3. The switch controller of claim 2, wherein the variable current source comprises:

a transistor through which the reference current flows; and an operational amplifier that has an output terminal connected to a gate electrode of the transistor and controls the transistor such that the reference current changes according to the output current.

4. The switch controller of claim 2, wherein the control voltage generator further comprises a current mirror circuit mirroring the reference current and transmitting a mirrored current to the charging current source and the discharging current source, and wherein the charging current source generates the charging current by converting the transmitted mirrored current with a first mirror ratio and the discharging current source generates the discharging current by converting the transmitted mirrored current with a second mirror ratio.

5. The switch controller of claim 4, wherein the control voltage generator further comprises a switch connected between the discharging current source and the ground and turned off at a turn-on time of the power switch, and the second mirror ratio is greater than the first mirror ratio.

6. The switch controller of claim 1, wherein the frequency controller comprises:

a rising comparator controlling an increase of the control voltage by comparing the control voltage with a rising threshold voltage;

a falling comparator controlling a decrease of the control voltage by comparing the control voltage with a falling threshold voltage; and an SR flip-flop receiving outputs of the rising comparator and the falling comparator, stopping the increase of the control voltage according to the output of the rising comparator, and stopping the decrease of the control voltage according to the output of the falling comparator.

7. The switch controller of claim 6, wherein the control voltage generator comprises:

a charging current source generating a charging current according to the reference current;

a discharging current source generating a discharging current according to the reference current;

a capacitor connected to a node to which the charging current source and the discharging current source are connected; and a switch connected between the discharging current source and the ground, the SR flip-flop turns off the switch according to the output of the falling comparator and turns on the switch according to the output of the rising comparator, and a voltage charged in the capacitor is the control voltage.

8. The switch controller of claim 6, wherein a turn-on time point of the power switch is controlled according to the output of the falling comparator.

9. The switch controller of claim 1, wherein the on-time controller controls turn-off of the power switch at a time point that an on-time control voltage increasing from the turn-on time point of the power switch reaches the reference voltage.

10. The switch controller of claim 9, wherein the on-time controller comprises:

a control current source receiving the reference current and generating the control current by converting the received reference current with a predetermined ratio;

a resistor in which the reference voltage is generated from a flow of the control current;

a capacitor being charged by a predetermined constant current from a turn-on time point of the power switch and generating the on-time control voltage; and a control comparator comparing the reference voltage with the on-time control voltage.

11. The switch controller of claim 10, wherein the frequency controller comprises:

a rising comparator controlling an increase of the control voltage by comparing the control voltage with a rising threshold voltage;

a falling comparator controlling a decrease of the control voltage by comparing the control voltage with a falling threshold voltage; and an SR flip-flop receiving outputs of the rising comparator and the falling comparator, stopping the increase of the control voltage according to the output of the rising comparator, and stopping the decrease of the control voltage according to the output of the falling comparator.

12. The switch controller of claim 11, wherein the on-time controller further comprises a switching transistor operating according to the output of the falling comparator, and the switching transistor is connected to the capacitor in parallel.

13. A switch control method controlling switching operation of a power switch in a converter, comprising:

generating a reference current based on a detected signal indicative of an output current of the converter;

increasing or decreasing of a control voltage according to the reference current;

sensing the control voltage, and controlling the increase or the decrease of the control voltage;

controlling a switching frequency of the power switch according to the reference current;

controlling an on-time of the power switch using a reference voltage determined according to a control current that depends on the reference current;

increasing the switching frequency of the power switch when the output current increases; and increasing the on-time of the power switch when the output current decreases.

14. The switch control method of claim 13, wherein the increasing or decreasing of the control voltage according to the reference current comprises:

charging a capacitor using a charging current that depends on the reference current; and discharging of the capacitor using a discharging current that depends on the reference current, and a voltage of the capacitor is the control voltage.

15. The switch control method of claim 13, wherein the controlling of the increase or the decrease of the control voltage comprises:

comparing the control voltage with a rising threshold voltage;

comparing the control voltage with a falling threshold voltage; and stopping the increase of the control voltage according to a result of the comparison between the control voltage and the rising threshold voltage and stopping the decrease of the control voltage according to a result of the comparison between the control voltage and the falling threshold voltage.

16. The switch control method of claim 15, wherein the controlling of the switching frequency comprises turning on the power switch according to a result of the comparison between the control voltage, controlled according to the reference current, and the falling threshold voltage.

17. The switch control method of claim 13, wherein the controlling of the on-time comprises controlling turning off of the power switch at a time point at which an on-time control voltage increasing from a turn-on time point of the power switch reaches the reference voltage.

18. A converter comprising:
 a transformer transmitting power from a primary side to a secondary side;
 a power switch connected to a coil in the primary side of the transformer;
 a feedback unit synchronizing a reference current of the primary side according to an output current of the secondary side; and
 a switch controller generating a reference current based on a detected signal indicative of the output current, controlling a switching frequency of the power switch according to the reference current, controlling an on-time of the power switch using a reference voltage determined according to a control current that depends on the reference current, increasing the switching frequency of the power switch when the output current is increasing, and increasing the on-time of the power switch when the output current is decreasing.

19. The converter of claim 18, wherein the switch controller generates a control voltage increased or decreased according to the reference current, controls the increase of the control voltage by comparing the control voltage with a rising threshold voltage, controls the decrease of the control voltage by comparing the control voltage with a falling threshold voltage, and controls the turn-on time point of the power switch according to a result of the comparison between the control voltage and the falling threshold voltage.

20. The converter of claim 18, wherein the switch controller controls turn-off of the power switch at a time point at which an on-time control voltage increasing from a turn-on time point of the power switch reaches the reference voltage.

\* \* \* \* \*